(12) United States Patent
Nakahara et al.

(10) Patent No.: US 11,262,504 B2
(45) Date of Patent: Mar. 1, 2022

(54) OPTICAL CONNECTION APPARATUS

(71) Applicant: NAKAHARA OPTO-ELECTRONICS LABORATORIES, INC, Mito (JP)

(72) Inventors: Motohiro Nakahara, Mito (JP); Koichi Arishima, Mito (JP)

(73) Assignee: NAKAHARA OPTO-ELECTRONICS, Mito (JP)

( * ) Notice: Subject to any disclaimer, the term of this patent is extended or adjusted under 35 U.S.C. 154(b) by 0 days.

(21) Appl. No.: 17/061,142

(22) Filed: Oct. 1, 2020

(65) Prior Publication Data

US 2021/0103104 A1 Apr. 8, 2021

(30) Foreign Application Priority Data

Oct. 2, 2019 (JP) .............................. JP2019-182396

(51) Int. Cl.
*G02B 6/34* (2006.01)
*G02B 6/293* (2006.01)
*G02B 6/42* (2006.01)
*G02B 6/36* (2006.01)
*G02B 6/30* (2006.01)
*G02B 6/32* (2006.01)

(52) U.S. Cl.
CPC ............. *G02B 6/34* (2013.01); *G02B 6/2937* (2013.01); *G02B 6/3672* (2013.01); *G02B 6/4214* (2013.01); *G02B 6/30* (2013.01); *G02B 6/32* (2013.01)

(58) Field of Classification Search
CPC .......... G02B 6/2937; G02B 6/30; G02B 6/32; G02B 6/34; G02B 6/3672; G02B 6/4214
See application file for complete search history.

(56) References Cited

U.S. PATENT DOCUMENTS

| 6,751,379 | B2 * | 6/2004 | Capewell | G02B 6/29367 385/31 |
| 7,208,719 | B2 * | 4/2007 | Spears | G02B 13/0095 250/216 |
| 7,366,376 | B2 * | 4/2008 | Shishkov | A61B 5/0084 385/35 |
| 10,054,744 | B2 * | 8/2018 | Doi | G02B 6/30 |
| 10,816,789 | B2 * | 10/2020 | Elmaanaoui | A61B 1/043 |
| 2011/0299811 | A1 * | 12/2011 | O'Brien | G02B 6/32 385/26 |

(Continued)

FOREIGN PATENT DOCUMENTS

| JP | 6-337319 | 12/1994 |
| JP | 20080009098 | 1/2008 |
| JP | 2017203966 | 11/2017 |

*Primary Examiner* — Daniel Petkovsek
(74) *Attorney, Agent, or Firm* — Ohlandt, Greeley, Ruggiero and Perle, LLP

(57) ABSTRACT

An optical connection apparatus comprising a prism that extracts N×M beams of outgoing light from an optical circuit, a two-dimensional GRIN lens array of N×M GRIN lenses, a spacer, having a thickness according to the optical path length in the prism, that transmits N×M outgoing beams from the two-dimensional GRIN lens array, and a two-dimensional fiber array that causes the N×M beams to be incident on optical fibers, the ends of optical fibers being disposed at the focal point of each of the beams transmitted through the spacer.

8 Claims, 15 Drawing Sheets

(56) References Cited

U.S. PATENT DOCUMENTS

| | | | |
|---|---|---|---|
| 2014/0153864 A1* | 6/2014 | Sinclair | G02B 23/26 |
| | | | 385/12 |
| 2014/0153881 A1 | 6/2014 | Liff et al. | |
| 2017/0090180 A1 | 3/2017 | Ehrhardt et al. | |
| 2019/0029570 A1* | 1/2019 | Stankovic | A61B 5/12 |
| 2019/0353844 A1 | 11/2019 | Nakanishi et al. | |

* cited by examiner

OPTICAL CONNECTION APPARATUS

BACKGROUND

1. Field of the Disclosure

The present disclosure relates to an optical connection apparatus for connecting an optical circuit and an optical fiber.

2. Discussion of the Background Art

An optical circuit capable of connecting to a single-mode fiber (SMF) has been proposed (for example, see Patent Literature 1). To connect to an SMF, the waveguide spacing in the optical circuit needs to be equal to or greater than the outer diameter of the optical fiber.

CITATION LIST

Patent Literature

Patent Literature 1: JP 2017-203966 A

Technical Problem

To economize and miniaturize chips, reducing the waveguide spacing in the optical circuit is important. Accordingly, an object of the present disclosure is to provide an optical connection apparatus that makes it possible to reduce the waveguide spacing in the optical circuit.

SUMMARY

The optical connection apparatus of the present disclosure comprises a prism, a two-dimensional gradient index (GRIN) lens, and a two-dimensional fiber array, and surface mounting is applied in the optical connection apparatus for connecting the optical circuit and the optical fiber.

Specifically, the optical connection apparatus of the present disclosure comprises:

a prism that extracts N×M beams of outgoing light from an optical circuit, where N and M are integers equal to or greater than 2;

a two-dimensional gradient index (GRIN) lens array of N×M GRIN lenses that condense each of the beams extracted by the prism;

a spacer, having an optical path length equal to an optical path length in the prism, that transmits N×M outgoing beams from the two-dimensional GRIN lens array; and a two-dimensional fiber array that holds N×M optical fibers whose ends are respectively disposed at a focal point of each of the GRIN lenses, and propagates the N×M beams transmitted through the spacer to the N×M optical fibers.

Advantageous Effects of Disclosure

According to the present disclosure, an optical connection apparatus that makes it possible to reduce the waveguide spacing in the optical circuit can be provided.

DETAILED DESCRIPTION OF THE PREFERRED EMBODIMENT

Hereinafter, embodiments of the present disclosure will be described in detail and with reference to the drawings. However, the present disclosure is not limited to the embodiments indicated below. These examples are merely illustrative, and the present disclosure can be carried out in embodiments subjected to various modifications and refinements on the basis of the knowledge of those skilled in the art. Note that components having the same symbols in the description and the drawings are taken to illustrate the same component as each other.

(Basic Configuration of Optical Connection Apparatus)

Figure 1:
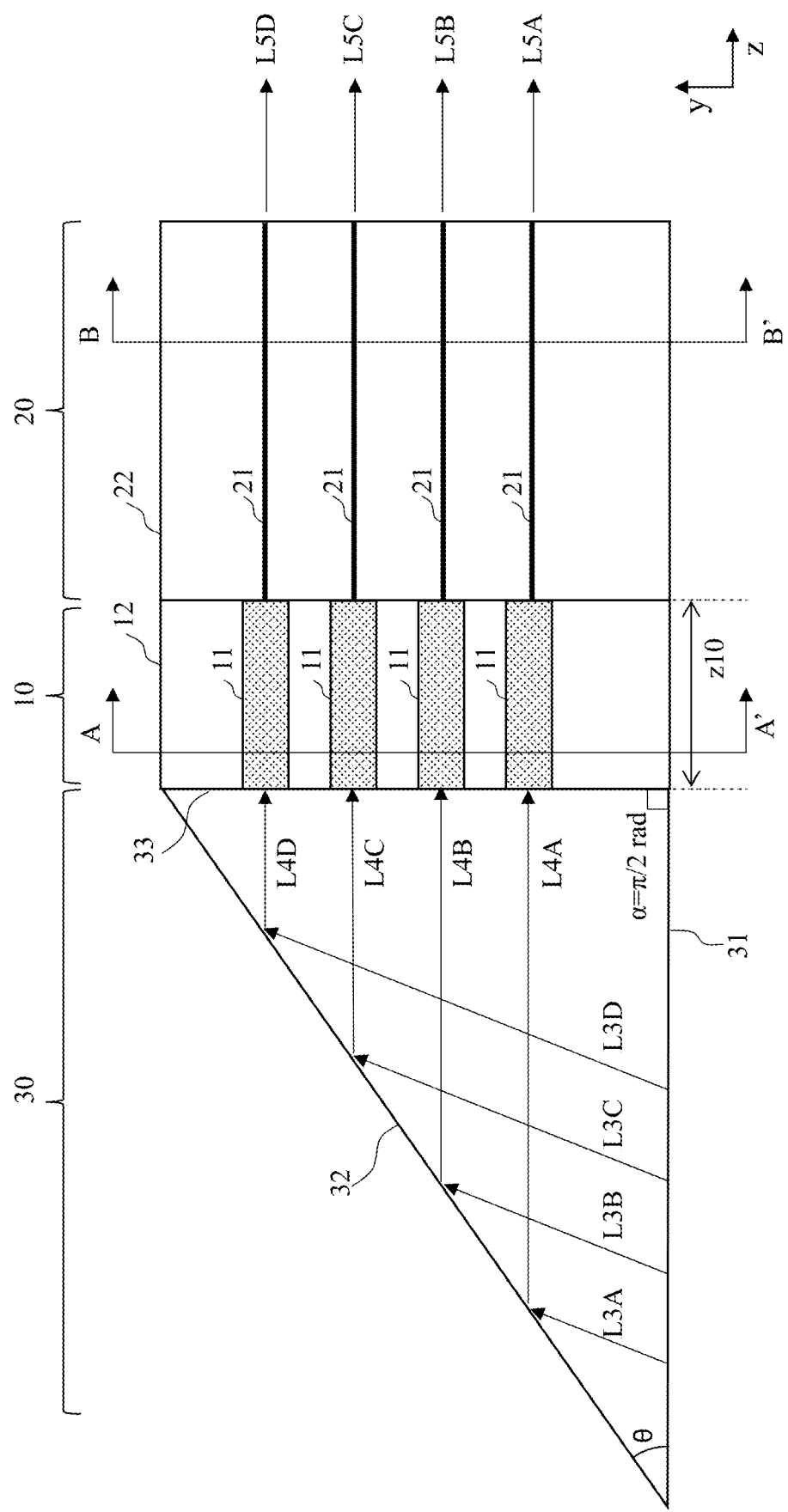
FIG. 1 illustrates a configuration example of an optical connection apparatus according to the present disclosure.

FIG. 1 illustrates a configuration example of an optical connection apparatus according to the present disclosure. The optical connection apparatus according to the present disclosure comprises a prism 30, a two-dimensional GRIN lens array 10, and a two-dimensional fiber array 20. The prism 30, the two-dimensional GRIN lens array 10, and the two-dimensional fiber array 20 are connected in series in the z-axis direction. The two-dimensional GRIN lens array 10 comprises a plurality of GRIN lenses 11. The two-dimensional fiber array 20 comprises a plurality of optical fibers 21.

In the present disclosure, outgoing beams L3A, L3B, L3C, and L3D from the optical circuit are incident on a plane of incidence 31 of the prism 30, and beams L4A, L4B, L4C, and L4D reflected by a plane of reflection 32 of the prism 30 exit from an outgoing plane 33 and are incident on the GRIN lenses 11. Each of the beams incident on the GRIN lenses 11 from the prism 30 are condensed into the optical fibers 21. With this arrangement, beams L5A, L5B, L5C, and L5D exit from the optical fibers 21.

Figure 2:
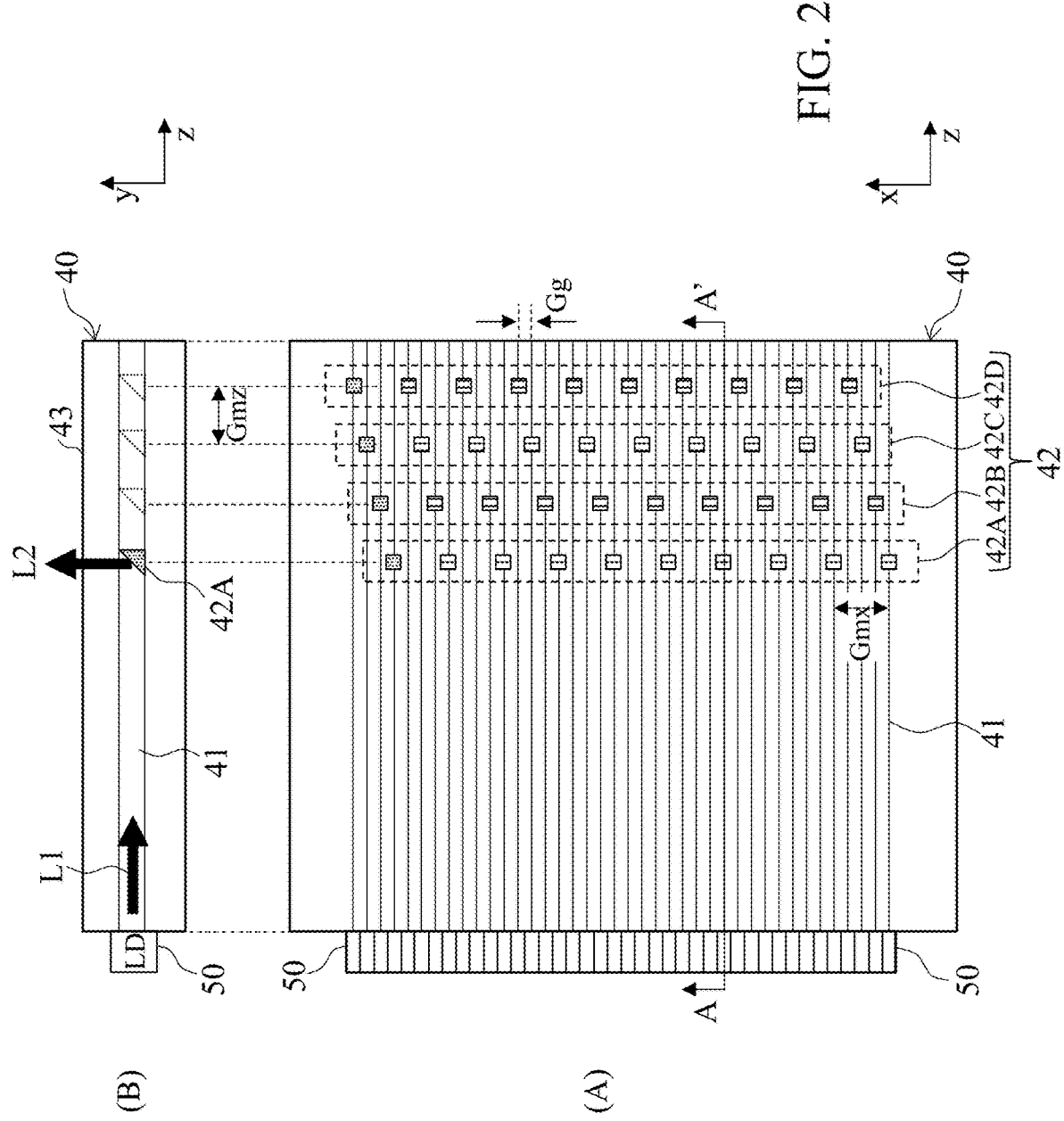
FIG. 2 illustrates an example of an optical circuit according to the present disclosure.

FIG. 2 illustrates an example of an optical circuit according to the present disclosure. An optical circuit 40 is a circuit in which optical waveguides 41 are formed, and includes silicon photonics and a planar lightwave circuit (PLC). FIG. 2(A) illustrates a configuration in the x-z plane of the optical circuit, and FIG. 2(B) illustrates the cross section of A-A' in FIG. 2(A). The optical circuit 40 according to the present disclosure comprises optical waveguides 41 arrayed in parallel in the x-axis direction with a spacing Gg. An LD 50 is connected to the end of each optical waveguide 41.

As illustrated in FIG. 2(B), a beam L1 from each LD 50 is guided by each optical waveguide 41, and is reflected by a mirror 42 disposed in each optical waveguide 41. A reflected beam L2 exits from a top face 43 of the optical circuit 40. The beam L2 is incident on the prism 30 as the outgoing beams L3A, L3B, L3C, and L3D.

Here, the mirrors 42 disposed in adjacent optical waveguides 41 are offset from each other in the z-axis direction. In FIG. 2(A), as an example, a 4×10 two-dimensional arrangement that arranges the mirrors 42 in four places in the z-axis direction is adopted. With this arrangement, a spacing Gmx between the mirrors 42 in the x-axis direction is expanded to four times the spacing Gg. The spacing Gmx is a spacing in which the optical fibers 21 can be disposed, and is at least 125 μm or at least 80 μm for example.

Here, the arrangement size of the mirrors 42 in the optical circuit 40 is not limited to 4×10. For example, N×M beams may be outgoing from the optical circuit 40, where N and M are any natural numbers equal to or greater than 2. The prism 30 reflects the N×M beams while maintaining the spacing Gg and Gmx in the x-axis direction. Hereinafter, the case where N=4 and M=10 will be described as one example of the present disclosure.

Also, the existing structure from the optical waveguide 41 to the prism 30 is not limited to a mirror. It is sufficient for beams guided by the optical waveguides to efficiently exit to the prism 30, and a structure other than a mirror, such as a prism structure or a grating structure, is also possible.

Figure 3:
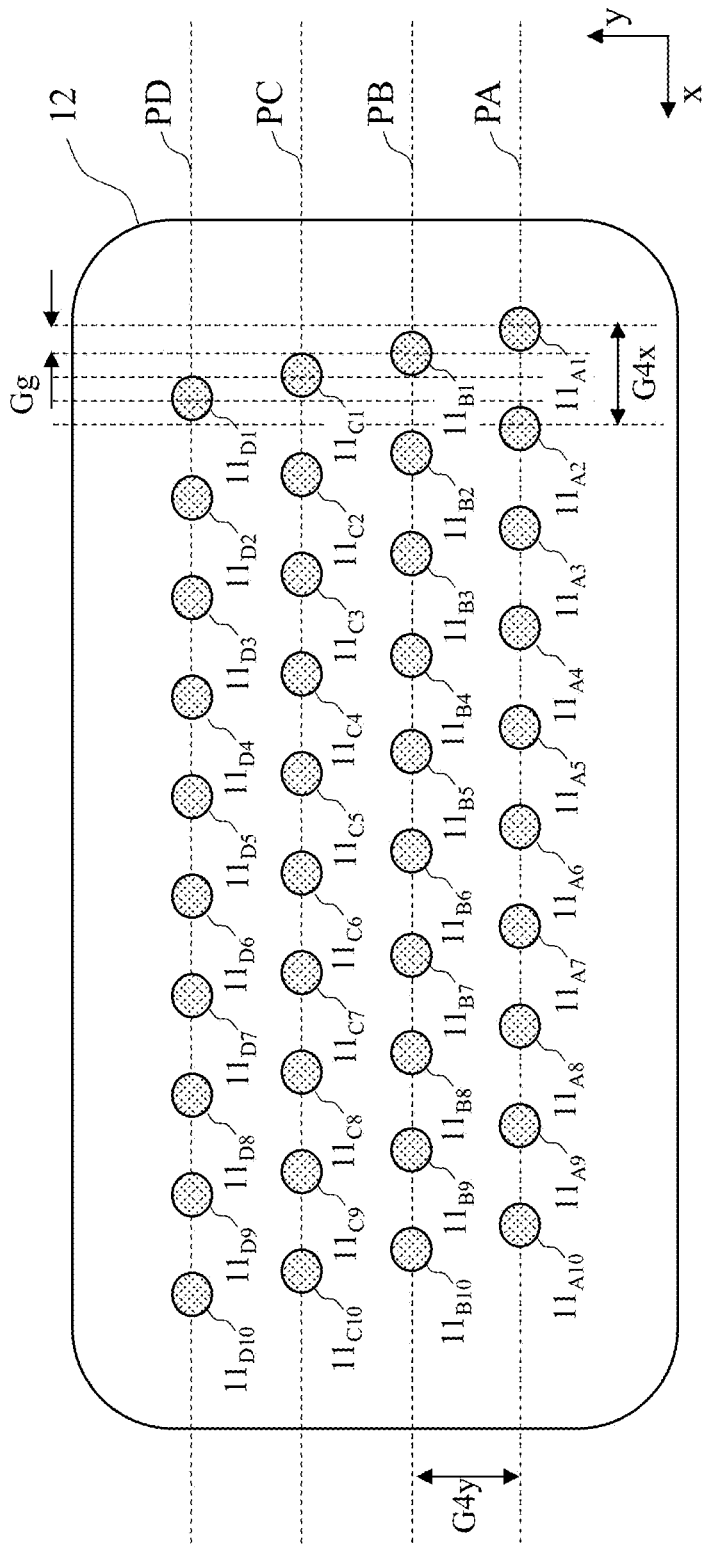
FIG. 3 illustrates an example of a cross section view of A-A' in FIG. 1.

FIG. 3 illustrates an example of a cross section view of A-A' in FIG. 1. The cross section view of A-A' illustrates a cross section of the two-dimensional GRIN lens array 10. The two-dimensional GRIN lens array 10 comprises a plurality of GRIN lenses $11_{A1}$ to $11_{A10}$, $11_{B1}$ to $11_{B10}$, $11_{C1}$ to $11_{C10}$, and $11_{D10}$, and a capillary 12 that surrounds the GRIN lenses $11_{A1}$ to $11_{A10}$, $11_{B1}$ to $11_{B10}$, $11_{C1}$ to $11_{C10}$, and $11_{D1}$ to $11_{D10}$. In the following disclosure, the GRIN lenses $11_{A1}$ to $11_{A10}$, $11_{B1}$ to $11_{B10}$, $11_{C1}$ to $11_{C10}$, and $11_{D1}$ to $11_{D10}$ will be designated "11" when not being individually specified.

The plurality of GRIN lenses 11 are a 10×4 two-dimensional array corresponding to the arrangement of the mirrors 42. A spacing G4x between the central axes of the GRIN lenses 11 in the x-axis direction is equal to the spacing Gmx of the mirrors 42. A spacing G4y between the central axes of the GRIN lenses 11 in the y-axis direction is set according to a spacing Gmz in the z-axis direction and an angle θ of the mirrors 42.

The spacing between the GRIN lens $11_{A1}$ and the GRIN lens $11_{C1}$ projected onto a plane PA and the spacing between the GRIN lens $11_{C1}$ and the GRIN lens $11_{D1}$ projected onto the plane PA are both equal to the spacing Gg between the optical waveguides 41. In this way, in the present disclosure, the central axes of each of the GRIN lenses 11 obtained by projecting the plurality of GRIN lens 11 onto a common x-z plane do not overlap each other and are arranged at the spacing Gg of the optical waveguides 41.

The central axes of the GRIN lenses 11 arrayed in the x-axis direction are arranged in the same plane. For example, the GRIN lenses $11_{A1}$ to $11_{A10}$ are arranged in the plane PA, the GRIN lenses $11_{B1}$ to $11_{B10}$ are arranged in a plane PB, the GRIN lenses $11_{C1}$ to $11_{C10}$ are arranged in a plane PC, and the GRIN lenses $11_{D1}$ to $11_{D10}$, are arranged in a plane PD. In this way, the GRIN lenses that guide beams having the same value of N are arranged in the same plane.

Figure 4:
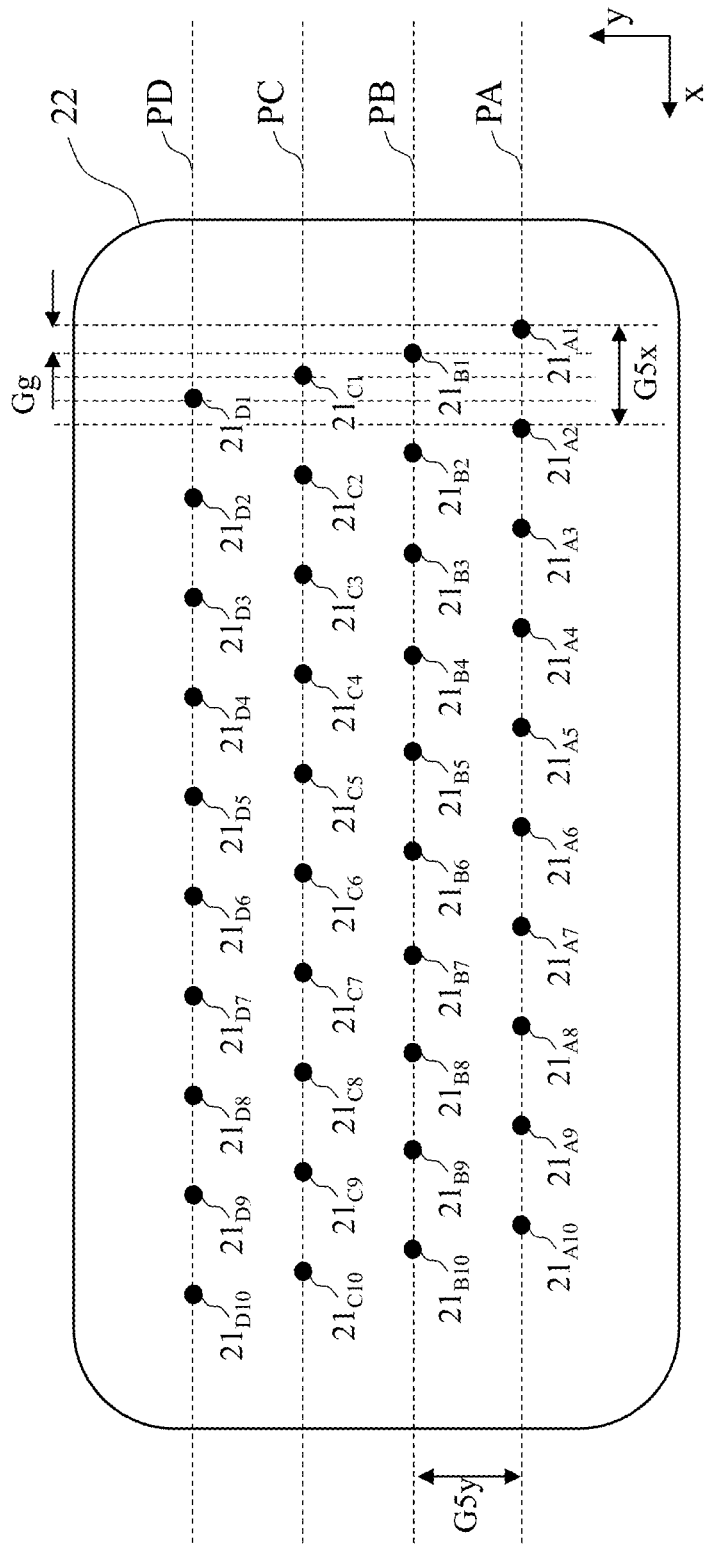
FIG. 4 illustrates an example of a cross section view of B-B' illustrated in FIG. 1.

FIG. 4 illustrates an example of a cross section view of B-B' illustrated in FIG. 1. The cross section view of B-B' illustrates a cross section of the two-dimensional fiber array 20. The two-dimensional fiber array 20 comprises a plurality of optical fibers $21_{A1}$ to $21_{A10}$, or $21_{B1}$ to $21_{B10}$, $21_{C1}$ to $21_{C10}$, and $21_{D1}$ to $21_{D10}$, a capillary 22 that surrounds the optical fibers $21_{A1}$ to $21_{A10}$, $21_{B1}$ to $21_{B10}$, $21_{C1}$ to $21_{C10}$, and $21_{D1}$ to $21_{D10}$. In the following disclosure, the optical fibers $21_{A1}$ to $21_{A10}$, to $21_{B1}$ to $21_{B10}$, $21_{C1}$ to $21_{C10}$, and $21_{D1}$ to $21_{D10}$ will be designated "21" when not being individually specified.

The central axes of the cores of the optical fibers 21 are arranged at positions corresponding to the connected GRIN lenses 11. For example, the cores of the plurality of optical fibers 21 are a 10×4 two-dimensional array corresponding to the arrangement of the mirrors 42. For example, a spacing G5y between the optical fibers 21 in the y-axis direction is equal to G4y, and a spacing G5x between the optical fibers 21 in the x-axis direction is equal to G4x.

The present disclosure is capable of using the optical fibers 21 arrayed with the spacing G5x and the spacing G5y to extract beams from the LD 50. Here, because the spacing between the optical fibers 21 can be widened, the present disclosure is capable of reducing crosstalk between the optical fibers 21. The spacing Gg and the spacing G5x may be any combination of values, but for example, the spacing G5x can be set to 200 μm even in the case where the spacing Gg is 50 μm.

In the present disclosure, an example in which the LD 50 is connected to the optical circuit 40 is illustrated, but the present disclosure is not limited to the LD 50. For example, instead of the LD 50, an element for a transmission/reception module such as a transceiver or a receiver can be applied. Furthermore, instead of the optical circuit 40, the present disclosure can also be applied to connections with on-board interconnects and multi-core fibers.

(Optical Paths Inside Prism)

Figure 5:
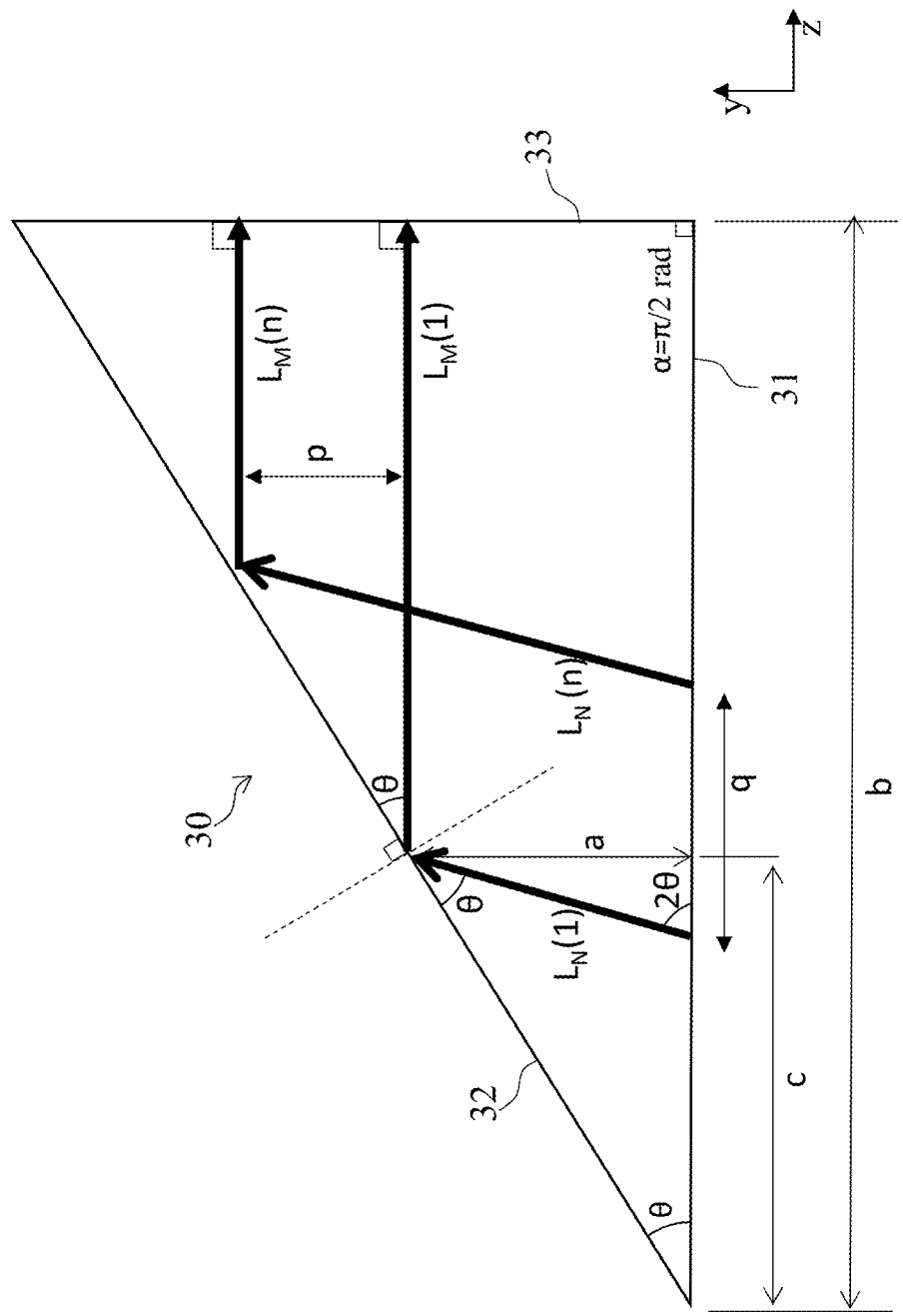
FIG. 5 is an explanatory diagram of optical paths inside a prism.

The optical paths inside the prism 30 in the present disclosure will be described with reference to FIG. 5. In FIG. 5, "$L_N(n)$" denotes the optical path from the plane of incidence 31 to the plane of reflection 32 corresponding to the beam L3A, L3B, L3C and L3D in FIG. 1, while "$L_M(n)$" denotes the optical path from the plane of reflection 32 to the outgoing plane 33 corresponding to the beam L4A, L4B, L4C and L4D in FIG. 1. "$L_M$" is parallel to the plane of incidence 31. The sign "b" denotes the length in the z-axis direction of the plane of incidence 31 of the prism 30. The sign "a" denotes the distance from the position where the beam corresponding to the optical path $L_N$ reflects off the plane of reflection 32 to the plane of incidence 31. The sign "p" denotes the distance in the y-axis direction between a first optical path $L_M(1)$ to an nth optical path $L_M(n)$. The sign "q" denotes the distance in the z-axis direction between a first optical path $L_N(1)$ to an nth optical path $L_N(n)$. The angle "θ" in the present disclosure denotes the angle obtained between the plane of reflection 32 and the optical path $L_N$, and also the angle obtained between the plane of reflection 32 and the optical path $L_M$.

Provided that $L_N(n)$ is the nth optical path and $L_M(n)$ is the nth optical path, the following formula is expressed according to c=a/tan(θ).

(Equation 1)

$$L_M = b - c = b - (a/\tan(\theta))$$ (Formula 1)

(Equation 2)

$$L_N = a/\sin(2\theta) \qquad \text{(Formula 2)}$$

Consequently, an optical path $L_T(n)$ in the prism 30 is expressed by the following formula.

(Equation 3)

$$\begin{aligned}L_T(n) &= L_M(n) + L_N(n) = \\ &\quad b - (a + p*(n-1))/\tan(\theta) + (a + p*(n-1))/\sin(2\theta)\end{aligned} \qquad \text{(Formula 3)}$$

where n=1, 2, 3, . . . , k.

On the other hand, the geometric length of the optical path $L_T$ inside the prism 30 is expressed by the following formula.

(Equation 4)

$$L_T = L_M + L_N = (b - a/\tan(\theta)) + a/\sin(2\theta) \qquad \text{(Formula 4)}$$

The distance b is fixed. The distance q can be varied by adjusting a spacing Gmz of the mirrors 42. Also, the angle θ can be varied by adjusting the reflection angle of the mirrors 42. Consequently, by adjusting at least one of the spacing Gmz, the reflection angle, and the angle θ of the mirrors 42, the optical path length of the optical path $L_T(n)$ can be adjusted.

An optical path length difference $\Delta L_T$ is expressed by the following formula.

(Equation 5)

$$\begin{aligned}\Delta L_T &= L_T(n) - L_T(n-1) = \\ &\quad (L_M(n) + L_N(n)) - (L_M(n-1) + L_N(n-1)) = \\ &\quad b - (a + p*(n-1))/\tan(\theta) + (a + p*(n-1))/\sin(2\theta) - \\ &\quad ((b - (a + p*(n-2))/\tan(\theta) + (a + p*(n-2))/ \\ &\quad \sin(2\theta)) = -p/\tan(\theta) + p/\sin(2\theta)\end{aligned} \qquad \text{(Formula 5)}$$

Here, $\sin(2\theta) = 2\sin(\theta)\cos(\theta)$ and $\cos(2\theta) = 2\cos(\theta)^2 - 1$. For this reason, the optical path length difference $\Delta L_T$ is expressed by the following formula.

(Equation 6)

$$\begin{aligned}\Delta L &= p*((-2\cos(\theta)^2 + 1)/(2*\sin(\theta)\cos(\theta))) = \\ &\quad -p*(\cos(2\theta)/\sin(2\theta))\end{aligned} \qquad \text{(Formula 6)}$$

Here, in the case where θ<45°, cos(2θ)>0 and sin(2θ)>0, and therefore $\Delta L_T$<0, or in other words, the optical path length is longer for smaller n. For this reason, in the case of the beams L3A to L3D illustrated in FIG. 1, the beam L3A whose incidence position on the plane of incidence 31 is farthest from the two-dimensional GRIN lens array 10 has the longest optical path length, while the beam L3D whose incidence position on the plane of incidence 31 is closest to the two-dimensional GRIN lens array 10 has the shortest optical path length.

Next, the relationship between the distances p and q will be described.

(Equation 7)

$$\begin{aligned}q &= L_M(n-1) - L_M(n) = b - (a + (n-2)*p)/\tan(\theta) - \\ &\quad (b - (a + (n-1)*P)/\tan(\theta)) = p/\tan(\theta)\end{aligned} \qquad \text{(Formula 7)}$$

In the case where θ<45°, tan(θ)<1, and therefore q<p according to Formula 7. Consequently, in the case where θ<45°, the spacing G4y is smaller than the spacing Gmz of the mirrors 42. Note that θ does not necessarily need to be less than 45°, and may also be 45° or greater and less than 90°.

First Embodiment

Figure 6:
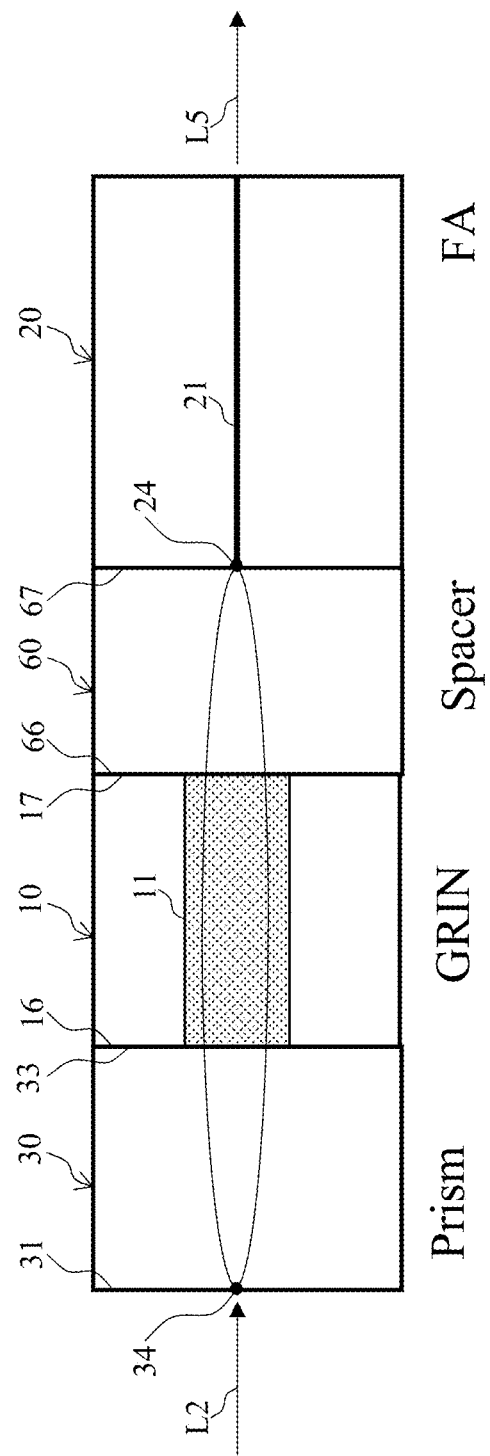
FIG. 6 illustrates a schematic configuration of an optical connection apparatus according to a first embodiment.

To connect the focal points on either side of each GRIN lens 11, it is necessary for the lens length of the GRIN lens 11 to be ½ pitch or n+½ pitch, where n is a positive integer, and the optical path length must also be symmetric. Accordingly, as illustrated in FIG. 6, the optical connection apparatus of the present embodiment comprises a spacer 60 for making the optical path length symmetric on either side of the GRIN lens 11. In FIG. 6, the plane of reflection 32 in the optical path from the plane of incidence 31 to the outgoing plane 33 is omitted for easy understanding.

Figure 7:
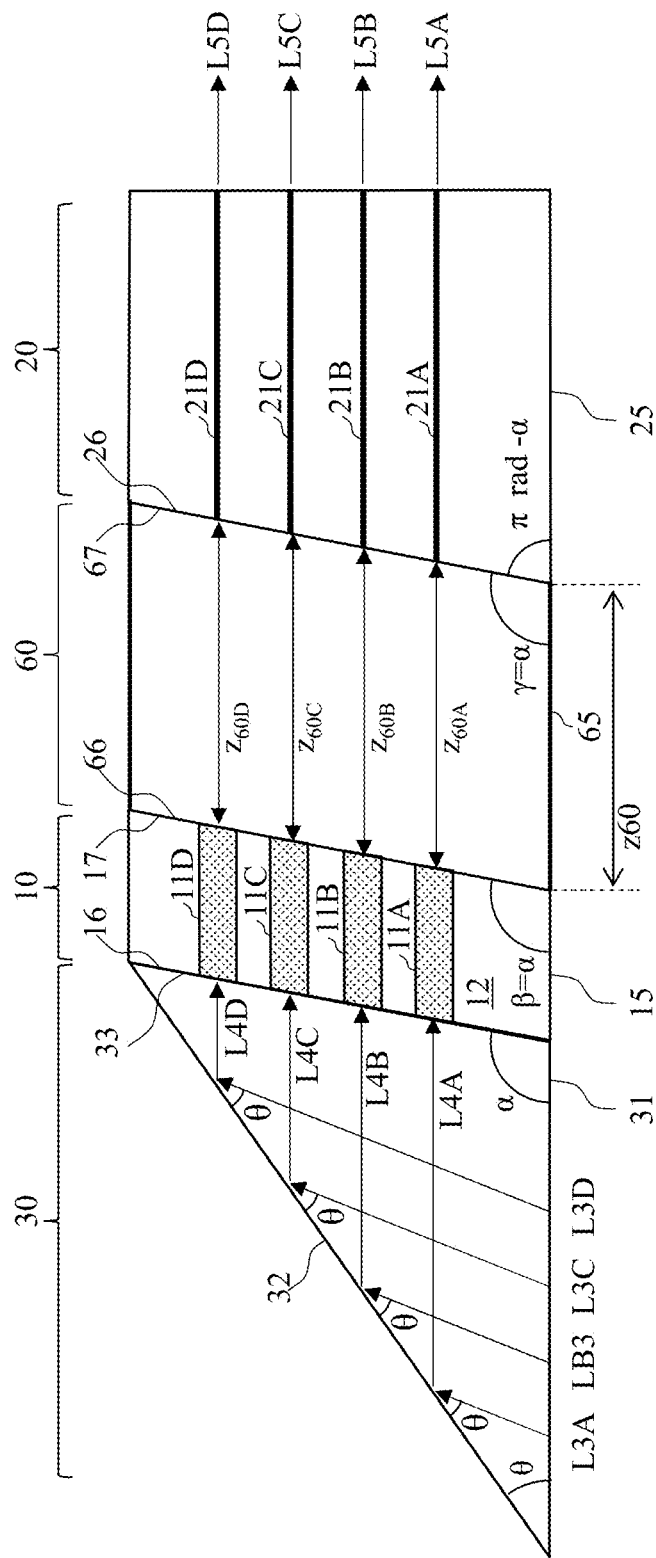
FIG. 7 illustrates a first configuration example according to the first embodiment.

FIG. 7 illustrates a first configuration example according to the present embodiment. In the configuration illustrated in FIG. 7, an angle α is set such that the optical path lengths of the beams L3A and L4A, the optical path lengths of the beams L3B and L4B, the optical path lengths of the beams L3C and L4C, and the optical path lengths of the beams L3D and L4D are equal. The angle α is the angle obtained between the plane of incidence 31 and the outgoing plane 33.

Also, the refractive index profile constants and the lens lengths of the GRIN lenses 11A, 11B, 11C, and 11D are equal, and the thicknesses $z_{60A}$, $z_{60B}$, $z_{60C}$, and $z_{60D}$ of the spacer 60 are equal. Also, the optical path length of a beam propagating through the spacer 60 with the thickness $z_{60A}$ is equal to the optical path length of the beams L3A and L4A. With this arrangement, in the first configuration example, the optical path length is symmetric on either side of each GRIN lens 11.

In this configuration, an angle β and an angle γ are equal to the angle α. The angle β is the angle obtained between a connecting face 17 and a face 15. The connecting face 17 is the end face that is connected to the spacer 60 among the end faces of the two-dimensional GRIN lens array 10. The face 15 is the face where the plane of incidence 31 is disposed, and FIG. 7 illustrates an example in which the face 15 forms the bottom face of the two-dimensional GRIN lens array 10. The angle γ is the angle obtained between a connecting face 67 and a face 65. The connecting face 67 is the end face connected to the two-dimensional fiber array 20 among the end faces of the spacer 60. The face 65 is the face where the plane of incidence 31 is disposed, and FIG. 7 illustrates an example in which the face 65 forms the bottom face of the spacer 60. With this arrangement, the angle obtained between a connecting face 26 and a bottom face 25 of the two-dimensional fiber array 20 is π/2−α.

In this configuration, the angle α is not a right angle, and the connecting faces 16, 17, 66, 67, and 26 are parallel to the outgoing plane 33. For this reason, the optical connection apparatus with this configuration is capable of preventing back reflection at the connecting faces 16, 17, 66, 67, and 26.

Figure 8:
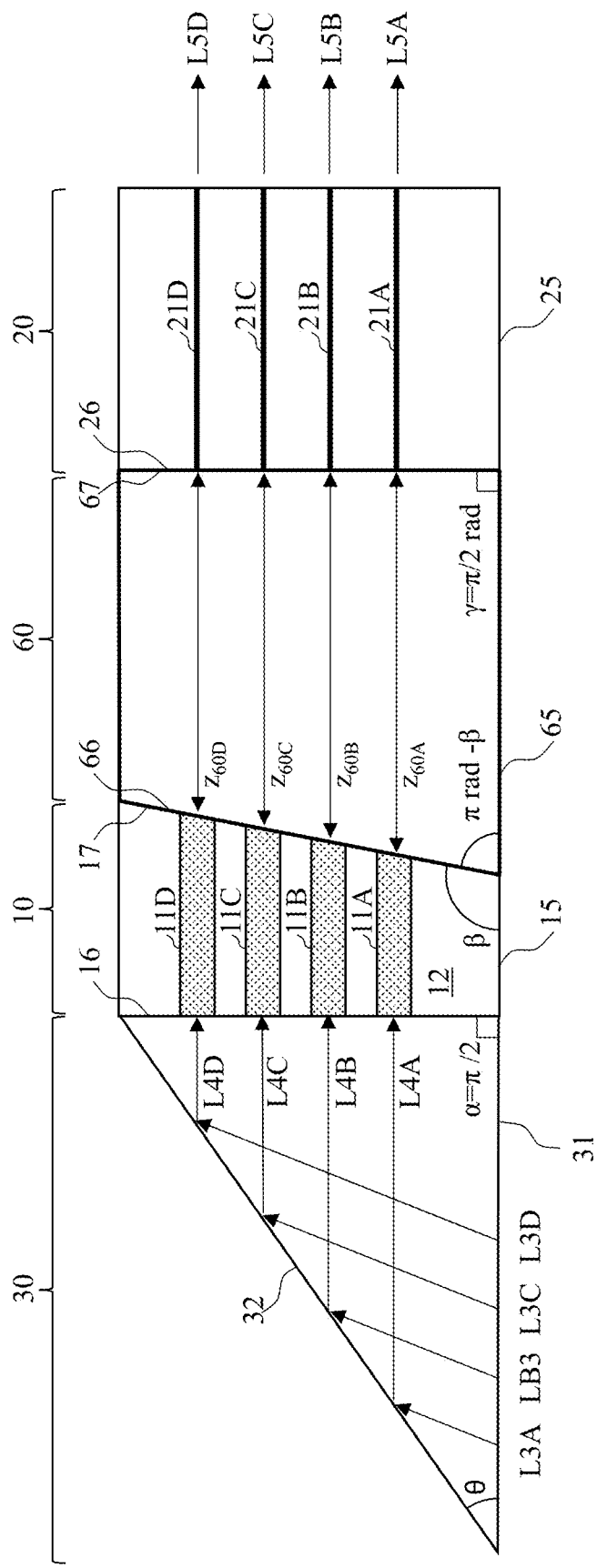
FIG. 8 illustrates a second configuration example according to the first embodiment.

FIG. 8 illustrates a second configuration example according to the present embodiment. In the second configuration example, the angle α is 90°, the optical path length of the beams L3A and L4A is the longest, and the optical path length of the beams L3D and L4D is the shortest.

In this configuration, the refractive index profile constants of the GRIN lenses 11A to 11D are equal. Accordingly, in this configuration, the lens length, or in other words the lens pitch, of the GRIN lenses 11A to 11D and the thicknesses $z_{60A}$, $z_{60B}$, and $z_{60D}$ in the spacer 60 are set such that the beams exiting the GRIN lenses 11A to 11D focus on optical fibers 21A to 21D. In this way, the thickness of the spacer 60 in this configuration is equal with respect to beams having equal values of N, and the thickness is different with respect to beams having different values of N. With this arrangement, in the second configuration example, the optical path length is symmetric on either side of each GRIN lens 11.

In this configuration, the angle γ can be set to a right angle by adjusting the angle β and the refractive index of the spacer 60. For this reason, with the optical connection apparatus having this configuration, a commercially available two-dimensional fiber array 20 can be used, and connecting the two-dimensional fiber array 20 to the spacer 60 is easy.

Figure 9:
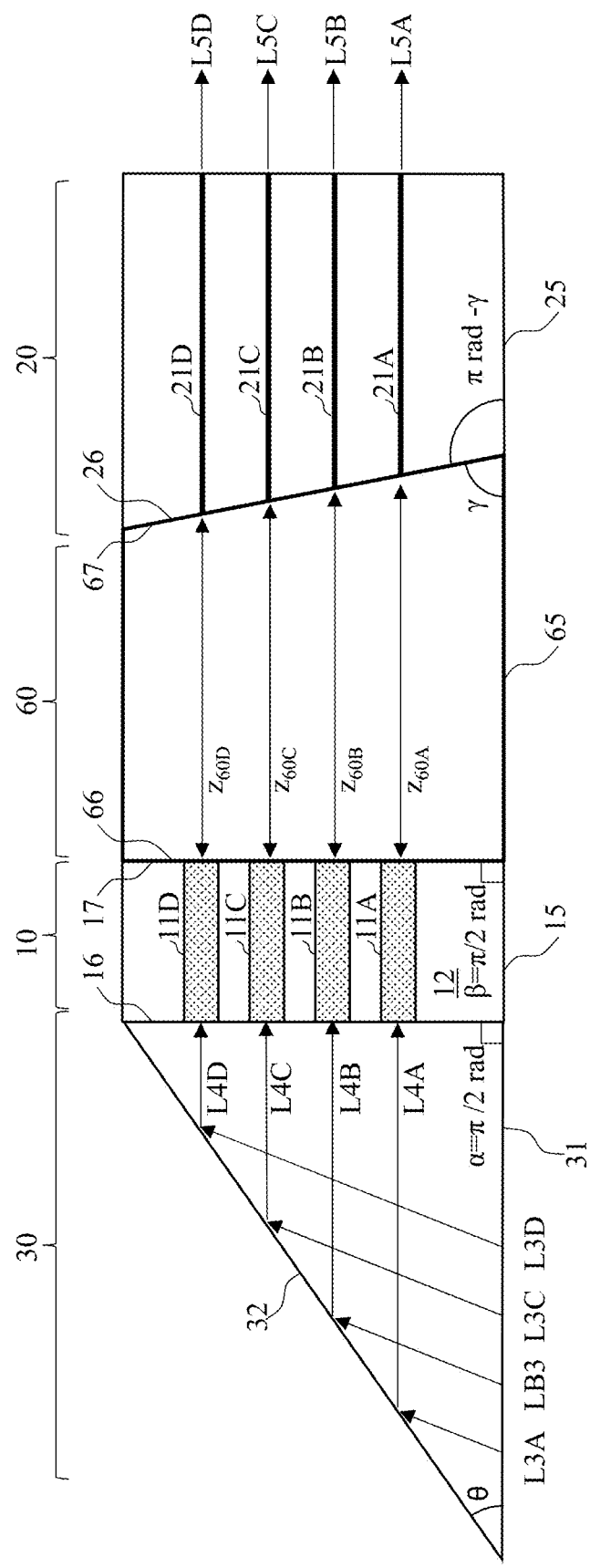
FIG. 9 illustrates a third configuration example according to the first embodiment.

FIG. 9 illustrates a third configuration example according to the present embodiment. In the configuration example illustrated in FIG. 9, the angle α is 90°, the optical path length of the beams L3A and L4A is the longest, and the optical path length of the beams L3D and L4D is the shortest.

In this configuration, the lens lengths, or in other words the lens pitch, of the GRIN lenses 11A to 11D are equal, and the angle β is a right angle. Accordingly, in this configuration, at least one of the lens diameter and the refractive index profile constant of the GRIN lenses 11A to 11D and the thicknesses $z_{60A}$, $z_{60B}$, $z_{60C}$, and $z_{60D}$ in the spacer 60 are set such that the beams exiting the GRIN lenses 11A to 11D focus on the optical fibers 21A to 21D. In this way, the thickness of the spacer 60 in this configuration is equal with respect to beams having equal values of N, and the thickness is different with respect to beams having different values of N. With this arrangement, in the third configuration example, the optical path length is symmetric on either side of each GRIN lens 11. The refractive index profile constant can be set by altering the central refractive index or by altering the peripheral refractive index.

In this configuration, because the angle α and the angle β are right angles, processing the two-dimensional GRIN lens array 10 is easy. Also, because the thicknesses $z_{60A}$, $z_{60B}$, $z_{60C}$, and $z_{60D}$ are different, the angle γ is not a right angle. For this reason, the optical connection apparatus with this configuration is capable of preventing back reflection at the connecting faces 67 and 26.

Second Embodiment

Figure 10:
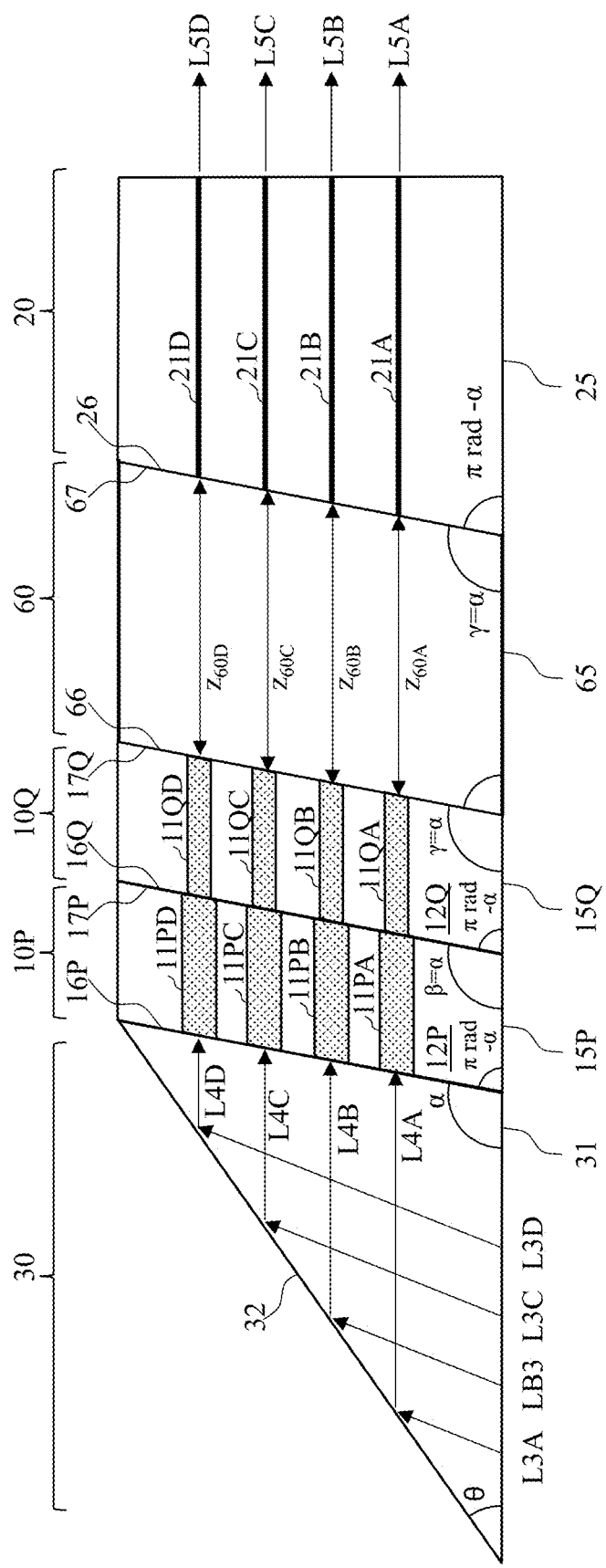
FIG. 10 illustrates a schematic configuration of an optical connection apparatus according to a second embodiment.

FIG. 10 illustrates a schematic configuration of an optical connection apparatus according to the present embodiment. The optical waveguides 41 and the optical fibers 21 may have a different numerical aperture (NA) in some cases. Accordingly, the present embodiment comprises two two-dimensional GRIN lens arrays 10P and 10Q.

Figure 11:
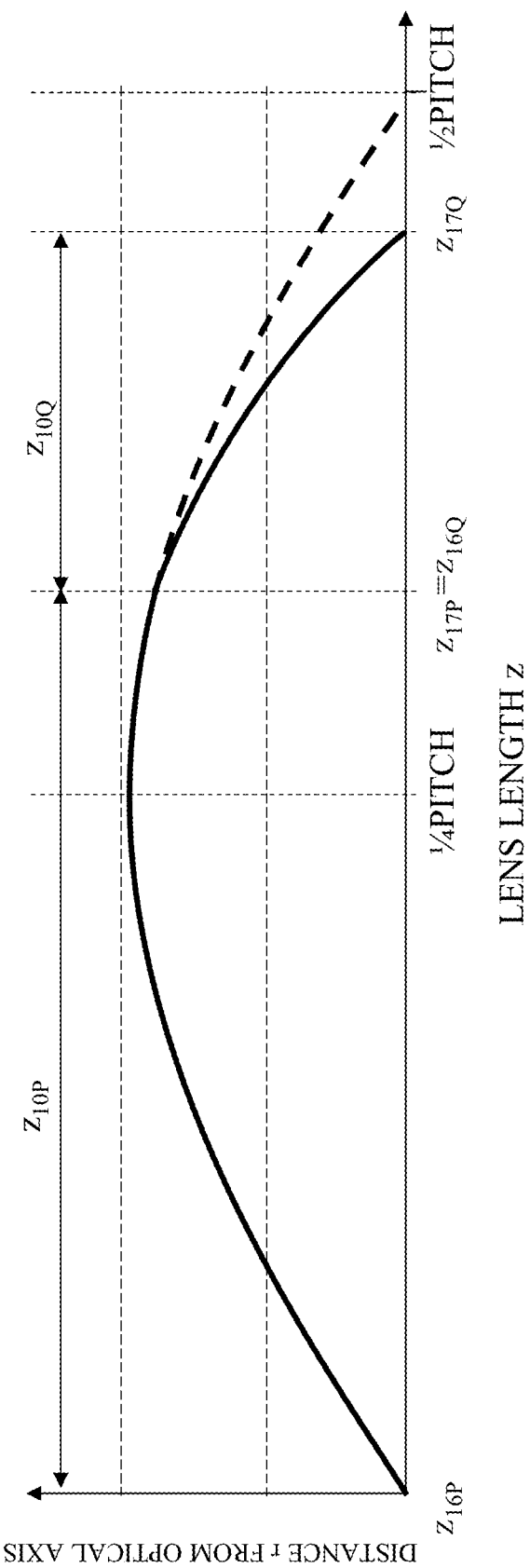
FIG. 11 illustrates an example of a ray trajectory in a GRIN lens.

FIG. 11 illustrates an example of a ray trajectory in a two-dimensional GRIN lens arrays 10P and 10Q. A lens length $z_{10P}$ of the GRIN lenses 11PA to 11PD provided in the two-dimensional GRIN lens array 10P is made to exceed ¼ pitch so that the beams L4A to L4D start to converge. The central axis of the GRIN lens 11PA and the central axis of the GRIN lens 11QA are disposed on the same line. The same applies to the other GRIN lenses 11PB to 11PD and 11QB to 11QD. With this arrangement, the beams L4A to L4D with a reduced beam diameter are incident on the GRIN lenses 11QA to 11QD provided in the two-dimensional GRIN lens array 10Q.

The refractive index profile constant of the GRIN lenses 11QA to 11QD provided in the two-dimensional GRIN lens array 10Q is set to a value according to the NA of the optical fibers 21A to 21D, such that the beams from the GRIN lenses 11QA to 11QD are incident on the optical fibers 21A to 21D.

As described above, in the optical connection apparatus with this configuration, the GRIN lenses 11PA to 11PD reduce the beam diameter of the beams L4A to L4D, while the GRIN lenses 11QA to 11QD causes the beams to be incident on the optical fibers 21A to 21D.

Third Embodiment

Figure 12:
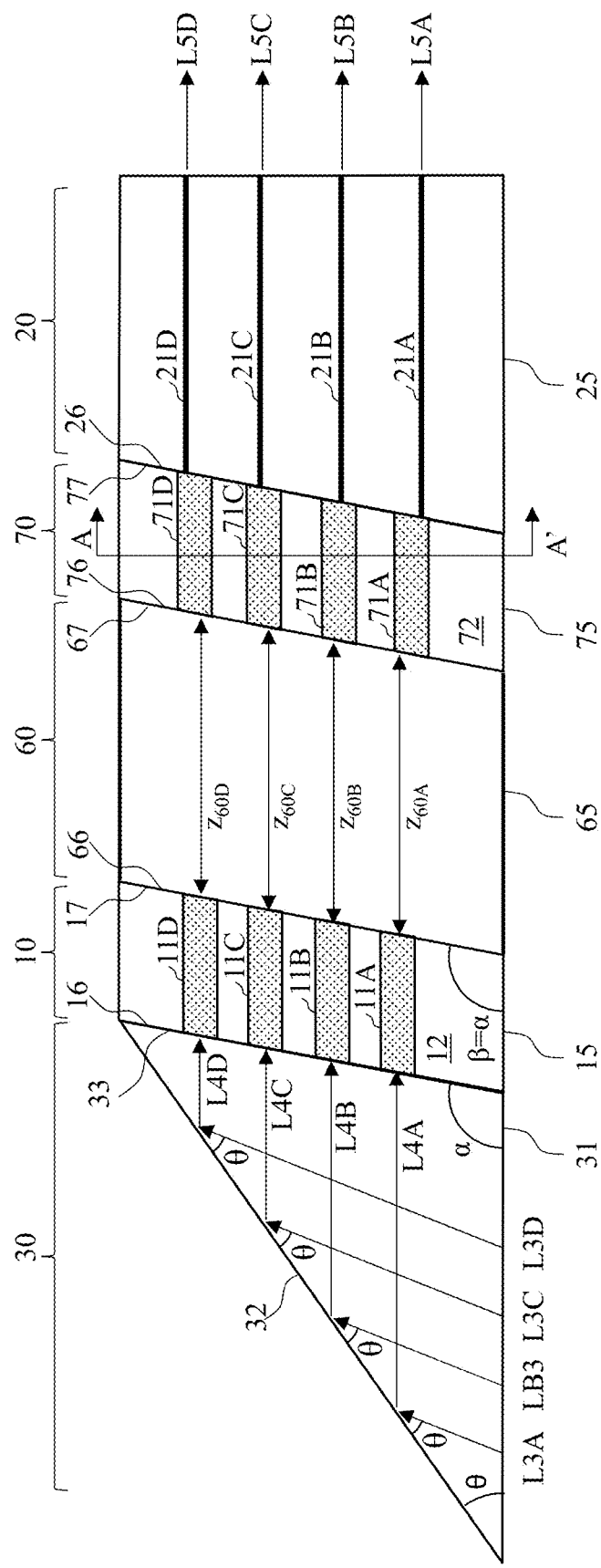
FIG. 12 illustrates a schematic configuration of an optical connection apparatus according to a third embodiment.

FIG. 12 illustrates a schematic configuration of an optical connection apparatus according to the present embodiment. The optical connection apparatus of the present embodiment additionally comprises a two-dimensional GRIN lens array 70 between the spacer 60 and the two-dimensional fiber array 20. As described in relation to the distances p and q, in the case where θ<45°, the spacing G4y is smaller than the spacing Gmz of the mirrors 42. In the present embodiment, by providing the two-dimensional GRIN lens array 70, the spacing G5y can be made wider than the spacing G4y.

Figure 13:
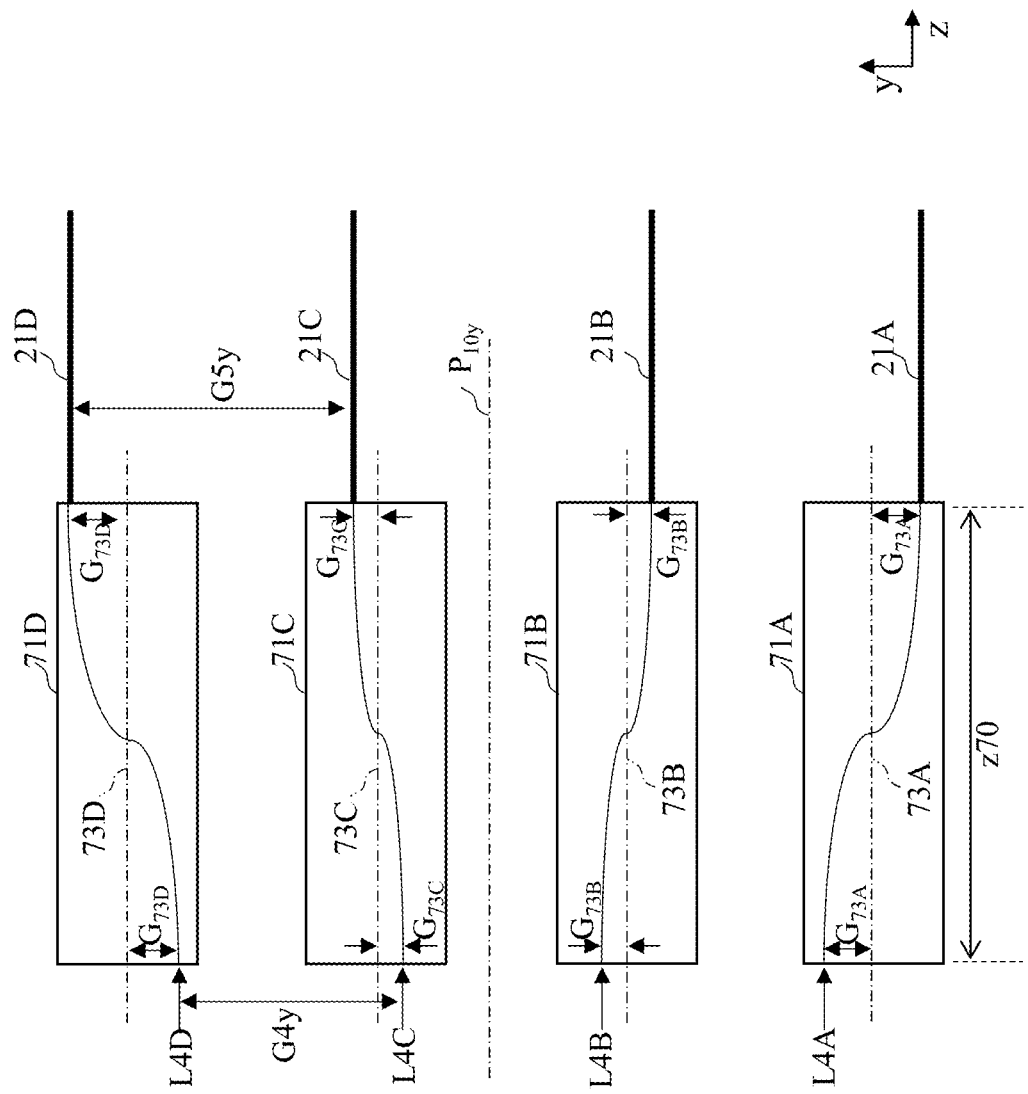
FIG. 13 illustrates a pickup diagram of a GRIN lens provided in a two-dimensional GRIN lens array.

FIG. 13 illustrates a pickup diagram of GRIN lenses 71A to 71D provided in the two-dimensional GRIN lens array 70. The beams L4A to L4D are incident on the GRIN lenses 71A to 71D from the side nearer a plane $P_{10y}$ than the central axes 73A to 73D of the GRIN lenses 71A to 71D. The plane $P_{10y}$ is a plane disposed midway between the plane PB and the plane PC in FIG. 3.

A lens length $z_{70}$ of the GRIN lenses 71A to 71D is set to ½ pitch or n+½ pitch, where n is a positive integer. For this reason, in the case where $G_{73A}$ is the spacing between the central axis 73A of the GRIN lens 71A and the beam L4A, the distance from the plane $P_{10y}$ to the optical fiber 21A is twice of $G_{73A}$ longer than the distance from the plane $P_{10y}$ to the beam L4A. The same applies to the GRIN lenses 71B to 71D. With this arrangement, the spacing G5y between the optical fibers 21 can be made greater than the spacing G4y between the central axes of the GRIN lenses 11.

Note that the spacing $G_{73A}$, the spacing $G_{73B}$ between the central axis 73B of the GRIN lens 71B and the beam L4B, the spacing $G_{73C}$ between the central axis 73C of the GRIN lens 71C and the beam L4C, and the spacing $G_{73D}$ between the central axis 73D of the GRIN lens 71D and the beam L4D may be the same or different from each other.

Fourth Embodiment

Figure 14:
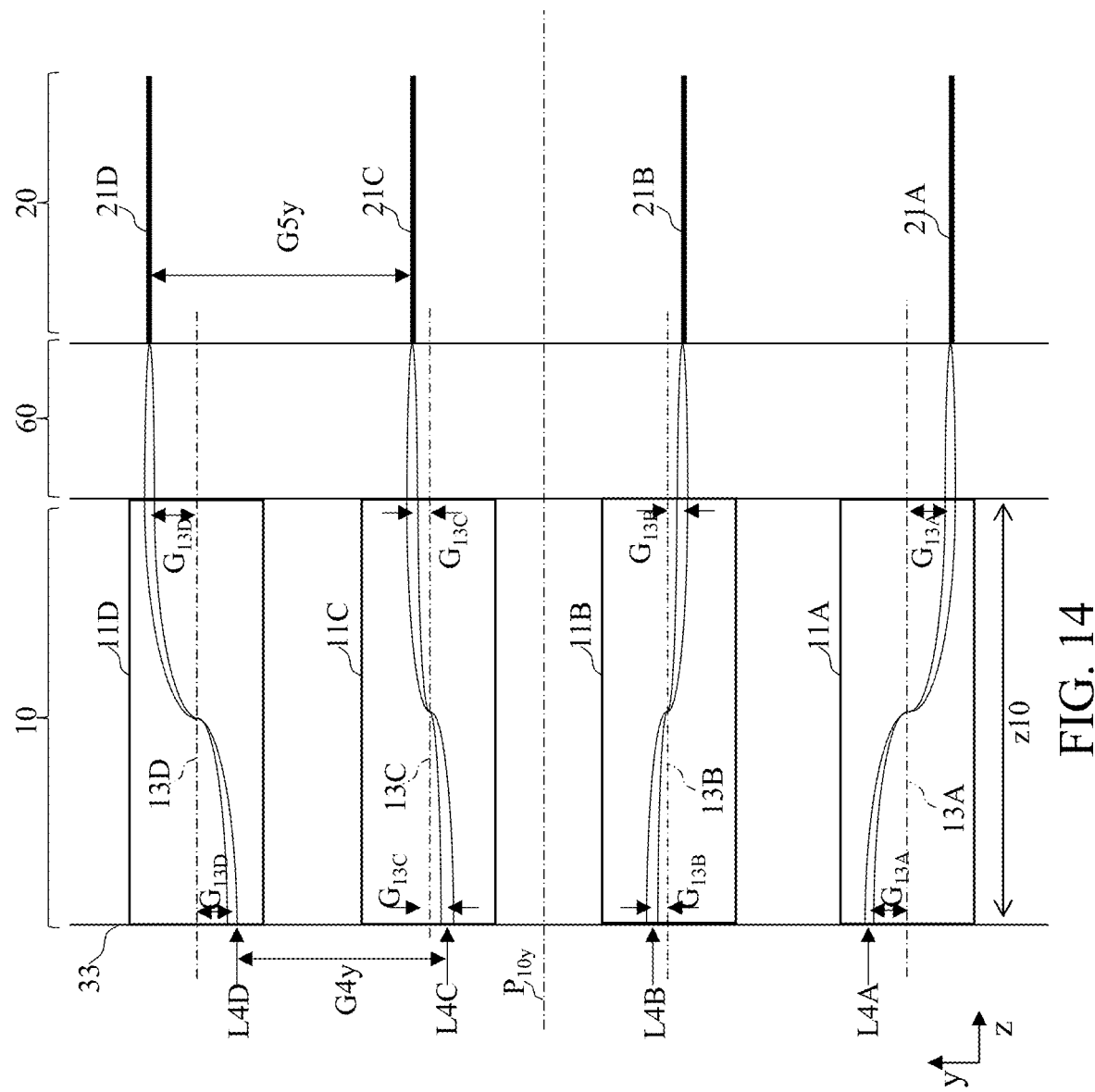
FIG. 14 illustrates a schematic configuration of an optical connection apparatus according to a fourth embodiment.

The optical connection apparatus according to the present embodiment applies the configuration of the two-dimensional GRIN lens array 70 according to the third embodiment to the two-dimensional GRIN lens array 10 according to the first and second embodiments. FIG. 14 illustrates a pickup diagram of the two-dimensional GRIN lens array 10, the spacer 60, and the two-dimensional fiber array 20 according to the present embodiment.

In the present embodiment, the central axes 13A to 13D of the GRIN lenses 11A to 11D provided in the two-dimensional GRIN lens array 10 are disposed at different positions from the beams L4A to L4D extracted by the prism 30 respectively. Specifically, the beams L4A to L4D are incident on the GRIN lenses 11A to 11D from the side nearer the plane $P_{10y}$ than the central axes 13A to 13D of the GRIN lenses 11A to 11D.

The lens length of each of the GRIN lenses 11A to 11D is ½ pitch or n+½ pitch, where n is a positive integer. For this reason, in the present embodiment, the cores of the optical fibers 21A to 21D provided in the two-dimensional fiber array 20 are connected at different positions from the central axes of the GRIN lenses 11A to 11D provided in the two-dimensional GRIN lens array 10 respectively.

In the present embodiment, in the case where $G_{13A}$ is the distance between the beam L4A and the central axis 13A, the distance from the plane $P_{10y}$ to the optical fiber 21 can be made twice of $G_{13A}$ wider than the distance from the plane $P_{10y}$ to the beam L4A.

Fifth Embodiment

Figure 15:
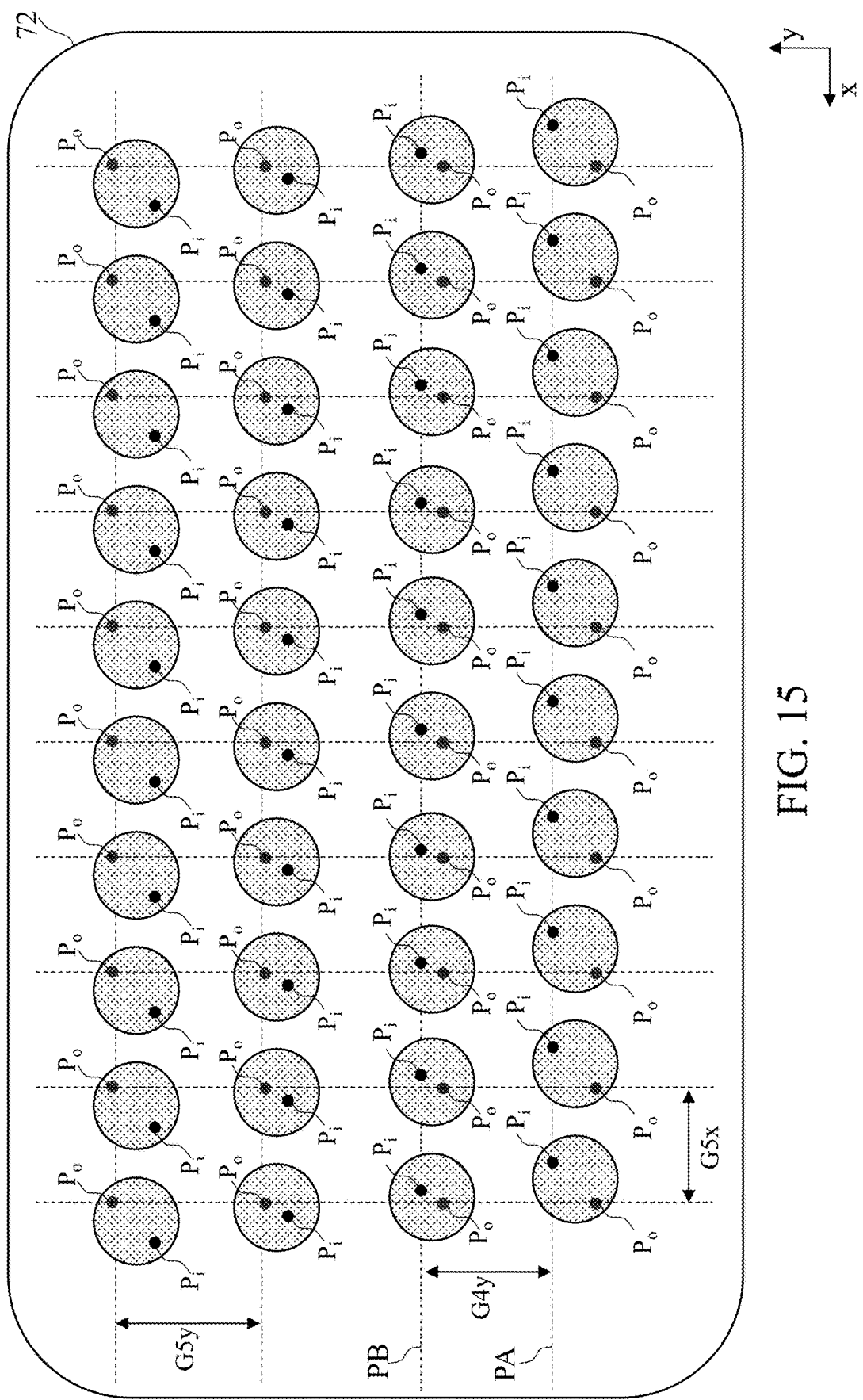
FIG. 15 illustrates an example of a cross section view of A-A' illustrated in FIG. 12.

FIG. 15 illustrates an example of a cross section view of A-A' illustrated in FIG. 12. Pi represents the incidence positions of the beams L4A to L4D on the connecting face 76, while Po represents the positions where the optical fibers 21A to 21D are connected on the connecting face 77. The incidence positions Pi are disposed at the positions of the optical fibers 21 illustrated in FIG. 4. In contrast, in the present embodiment, by adjusting the spacing $G_{73A}$ to $G_{73D}$, the 4×10 optical fibers 21 can be connected without being offset by the spacing Gg in the x-axis direction.

Note that in the two-dimensional GRIN lens array 10, an arrangement similar to the GRIN lenses 71B to 71D provided in the two-dimensional GRIN lens array 70 may also be adopted. In this way, by offsetting the incidence position of each GRIN lens 11 from the optical axis, the focal point spacing on the optical fiber 21 side can be widened. With this arrangement, the spacing G5y between the optical fibers 21 can be made wider than the spacing Gmz of the mirrors 42.

The foregoing embodiments illustrate an example in which the optical fibers 21 are densely arranged, but the present disclosure is not limited to optical fibers, and exhibits similar effects for other types of optical components besides optical fibers, such as laser diodes.

INDUSTRIAL APPLICABILITY

The present disclosure can be applied to the telecommunications industry.

REFERENCE SIGNS LIST 10, 10P, 10Q, 70 Two-dimensional GRIN lens array
11, 11A, 11B, 11C, 11D, $11_{A1}$ to $11_{A10}$, $11_{B1}$ to $11_{B10}$, $11_{C1}$ to $11_{C10}$, $11_{D1}$ to $11_{D10}$, 11PA, 11PB, 11PC, 11PD, 11QA, 11QB, 11QC, 11QD, 71A, 71B, 71C, 71D GRIN lens
12, 12P, 12Q Capillary
13A, 13B, 13C, 13D, 73A, 73B, 73C, 73D Central axis of GRIN lens
15, 15P, 15Q, 25, 65 Face
16, 16P, 16Q, 17, 17P, 17Q, 26, 66, 67, 76, 77 Connecting face
20 Two-dimensional fiber array
21, 21A, 21B, 21C, 21D, $21_{A1}$ to $21_{A10}$, $21_{B1}$ to $21_{B10}$, $21_{C1}$ to $21_{C10}$, $21_{D1}$ to $21_{D10}$ Optical fiber
22 Capillary
30 Prism
31 Plane of incidence
32 Plane of reflection
33 Outgoing plane
40 Optical circuit
41 Optical waveguide
42, 42A, 42B, 42C, 42D Mirror
50 LD
60 Spacer

What is claimed is:

1. An optical connection apparatus comprising:
  a prism that extracts N×M beams of outgoing light from an optical circuit, where N and M are integers equal to or greater than 2;
  a two-dimensional gradient index (GRIN) lens array of N×M GRIN lenses that condense the beams extracted by the prism;
  a spacer, having a path length equal to a path length of the prism, that transmits N×M outgoing beams from the two-dimensional GRIN lens array; and
  a two-dimensional fiber array that holds N×M optical fibers whose ends are respectively disposed at a focal point of each of the GRIN lenses, and propagates the N×M beams transmitted through the spacer to the N×M optical fibers.

2. The optical connection apparatus according to claim 1, wherein
  a thickness of the spacer is equal with respect to beams having equal values of N, and the thickness of the spacer is different with respect to beams having different values of N, and
  each GRIN lens provided in the two-dimensional GRIN lens array has a lens length that connects focal points at a connecting face between the spacer and the two-dimensional fiber array.

3. The optical connection apparatus according to claim 1, wherein
  a thickness of the spacer is equal with respect to beams having equal values of N, and the thickness of the spacer is different with respect to beams having different values of N, and
  each GRIN lens provided in the two-dimensional GRIN lens array has a refractive index profile constant that connects focal points at a connecting face between the spacer and the two-dimensional fiber array.

4. The optical connection apparatus according to claim 1, wherein
  the two-dimensional GRIN lens array includes
  a first two-dimensional GRIN lens array connected to the spacer and containing a two-dimensional arrangement of GRIN lenses having a refractive index profile constant according to an NA of each optical fiber provided in the two-dimensional fiber array, and
  a second two-dimensional GRIN lens array, having a lens length exceeding ¼ pitch, that causes each of the beams extracted by the prism to be incident on each of the GRIN lenses provided in the first two-dimensional GRIN lens array, respectively.

5. The optical connection apparatus according to claim 4, wherein
  the lens length of each of the GRIN lenses provided in the two-dimensional GRIN lens array is ½ pitch or n+½ pitch, where n is an integer,
  an incidence position of each of the beams from the prism on each of the GRIN lenses provided in the two-dimensional GRIN lens array is different from a central axis of each of the GRIN lenses provided in the two-dimensional GRIN lens array, and a core of each of the optical fibers provided in the two-dimensional fiber array is connected to a position different from an extension of the central axis of each of the GRIN lenses provided in the two-dimensional GRIN lens array.

6. The optical connection apparatus according to claim 5, wherein the central axes of the GRIN lenses having equal values of M from among the GRIN lenses provided in the two-dimensional GRIN lens array are disposed in a plane different from a plane orthogonal to a plane in which the central axes of the GRIN lenses having equal values of N from among the GRIN lenses provided in the two-dimensional GRIN lens array are disposed, and the plane in which the cores of the optical fibers having equal values of M from among the optical fibers provided in the two-dimensional fiber array is disposed in the same plane as the plane orthogonal to the plane in which the cores of the optical fibers having equal values of N from among the optical fibers provided in the two-dimensional fiber array are disposed.

7. The optical connection apparatus according to claim 4, further comprising:

a third two-dimensional GRIN lens array of N×M GRIN lenses, disposed between the spacer and the two-dimensional fiber array, that transmit the beams transmitted through the spacer, wherein the lens length of each of the GRIN lenses provided in the third two-dimensional GRIN lens array is ½ pitch or n+½ pitch, where n is an integer, a central axis of each of the GRIN lenses provided in the third two-dimensional GRIN lens array is disposed in a position different from a focal point of each of the beams transmitted through the spacer, and a core of each of the optical fibers provided in the two-dimensional fiber array is connected to a position different from the central axis of each of the GRIN lenses provided in the third two-dimensional GRIN lens array.

8. The optical connection apparatus according to claim 7, wherein the central axes of the GRIN lenses having equal values of M from among the GRIN lenses provided in the two-dimensional GRIN lens array are disposed in a plane different from a plane orthogonal to a plane in which the central axes of the GRIN lenses having equal values of N from among the GRIN lenses provided in the two-dimensional GRIN lens array are disposed, and the plane in which the cores of the optical fibers having equal values of M from among the optical fibers provided in the two-dimensional fiber array is disposed in the same plane as the plane orthogonal to the plane in which the cores of the optical fibers having equal values of N from among the optical fibers provided in the two-dimensional fiber array are disposed.

\* \* \* \* \*